United States Patent [19]

Weber

[11] Patent Number: 5,077,512

[45] Date of Patent: Dec. 31, 1991

[54] ENERGY CONSERVING ELECTRIC MOTOR CONTROL METHOD AND APPARATUS

[75] Inventor: Harold J. Weber, Holliston, Mass.

[73] Assignee: Savvy Frontiers Patent Trust, Holliston, Mass.

[21] Appl. No.: 237,045

[22] Filed: Aug. 29, 1988

[51] Int. Cl.[5] ............................................... H02P 5/40
[52] U.S. Cl. .................................... 318/776; 318/729; 318/775
[58] Field of Search ............... 318/775, 776, 777, 809, 318/340, 438, 778, 779, 799, 729, 496, 737; 361/71, 72

[56] References Cited

U.S. PATENT DOCUMENTS

| | | | |
|---|---|---|---|
| 3,016,482 | 1/1962 | Andersen et al. | 318/773 |
| 3,389,315 | 6/1968 | Andreas et al. | 318/779 |
| 4,242,625 | 12/1980 | Hedges | 318/812 |
| 4,263,540 | 4/1981 | Brandt et al. | 318/775 |
| 4,361,793 | 11/1982 | Nordell | 318/729 |
| 4,382,217 | 5/1983 | Horner et al. | 318/778 |
| 4,426,611 | 1/1984 | Espelage et al. | 318/803 |
| 4,434,394 | 2/1984 | Kellogg et al. | 318/771 |
| 4,453,118 | 6/1984 | Phillips et al. | 318/779 |
| 4,806,838 | 2/1989 | Weber | 318/775 |

Primary Examiner—David Smith, Jr.

[57] ABSTRACT

An energy efficient electric motor is provided with a supplementary run winding arrangement which operates in conjunction with the motor's main run winding to produce a combined magnetic field with sufficient strength to operate the motor under full load. Less than full load operation obtains increased efficiency through a reduction of power flow to the supplementary run winding arrangement, which brings about a significant reduction in stator core structure (eddy current) losses and winding (resistance) losses. A controller may predetermine the normal amount of magnetic field strength necessary during each portion of the motor's usual operating cycle and variously modulate the instant level of power coupled with the supplementary run winding arrangment.

20 Claims, 6 Drawing Sheets

ENERGY CONSERVING ELECTRIC MOTOR CONTROL METHOD AND APPARATUS

FIELD OF INVENTION

My invention relates to alternating current electric induction motors of fractional and integral horsepower capacity. Most particularly, my invention relates to commercial motors of cheap design which frequently operate with less than full loading, in which energy waste due to eddy current loss and copper loss are substantial. My invention serves to conserve considerable energy through its economic applicability in high-volume motor manufacture, such as motors used in major appliances, air-conditioners, refrigerators, and the like.

CO-PENDING APPLICATIONS

The following pending patent applications filed by the same inventor/applicant relate to the field of the instant invention:

| FILE NO. | FILE DATE | TITLE |
| --- | --- | --- |
| 075,990 | 7/21/87 | ELECTRIC INDUCTION MOTOR POWER CONTROL METHOD AND APPARATUS |
| 155,829 | 2/16/88 | ENERGY CONSERVING ELECTRIC INDUCTION MOTOR CONTROL M & A |
| 197,566 | 5/23/88 | A.C. INDUCTION MOTOR ENERGY CONSERVING POWER CONTROL M & A |

BACKGROUND OF INVENTION

Electric induction motors are widely used in appliances and machines of all kinds. In particular, induction motors find widespread usage in refrigeration equipment and air conditioners, both for domestic and commerical use. Induction motors may operate from single phase, or three phase, electric power. In the case of common single-phase power, induction motors have many design variations, most notably including:
split phase start, induction run,
capacitor start, induction run,
permanent split capacitor run (PSC),
capacitor start, split capacitor run,
shaded pole induction run; and,
induction/repulsion.

Induction motors operate efficiently only when driving a rated load: e.g., when operating under full load. When a modern induction motor of usual design drives a partial load, considerable inefficiency occurs and, as a result, a lot of energy is wasted. The electrical ENERGY LOSS manifests itself as undue heating of the motor; most common electric motors get very hot (with rated temperature rises of 40 or 50 degrees Centigrade above ambient being commonplace) after a period of operation, even with no load coupled to their output shaft. It is not uncommon for an ordinary major-appliance motor, such as found in a washing machine or the like, to consume several hundred watts even when completely unloaded.

A fundamental concern of my invention is to acheive considerable ENERGY CONSERVATION, which can result in less abuse of our environment and reduced consumption of our non-renewable fuel resources (such as oil gas, and coal) which are commonly used to generate electricity. With operational and regulatory setbacks having been encountered by the electric power industry relative with the construction and use of nuclear power plants, together with severe environmental and economic restrictions on the construction of hydro-electric and other such kinds of power generating plants, there is little near-term expectation that new electric power generating stations will be run from anything other than conventional fuels such as coal, oil, and natural gas. It therefore behooves the electric power industry to try to spread out the consumption of such relatively limited and non-renewable fuels over as long of period of time as possible to allow for the long-term development of some kinds of suitable alternative methods for producing goodly amounts of electric power. The electric power industry is, however, geared mainly to respond to demand and therefore if demand increases they simply must put more generating capacity on-line and as a result of such immediate consideration they also must ignore any issues of how such short-term increases in consumption may impact future power availability and cost. Aside from merely conserving these finite sources of fuel from wasteful consumption, is that of concern for perhaps irreversible contamination of the Earth's atmosphere. The result of such contamination, which in part results from smoke emitted by fossil-fuel power plants, is that of a "greenhouse effect" that tends to increase the Earth's mean temperature, and the detrimental effects of "acid rain" which abounds over much of the United States. Conservation of our fuel resources and protection of our life-supporting environment is the responsibility of every level of society, but certain levels (such as the engineering of manufactured products) carry greater intrinsic responsibility for reducing energy waste than others.

Electrical inefficiency of products is a particular kind of energy waste which is neither the direct responsibility of the electric power producer or the user (consumer) of such products. Under most circumstances, a consumer will purchase a more energy efficient product if that product is not disproportionately priced relatively with a less efficient product. It is therefore important to realize that, with the exception of dedicated energy conservation advocates or zealots, a product having better electrical efficiency will not normally sell well unless it is priced at about the same level as that of less well engineered products having inferior electrical efficiency. My invention therefore endeavors to particularly address the need for reducing energy consumption by mass-marketed products having known high levels of energy waste through techniques and approaches which do not contribute any significant additional cost to the product nor require re-tooling investment by the manufacturer of such products. As a result, any new product based on my invention maintains its price attractiveness to the buyer, while some sales advantage may be leveraged out of the improved efficiency (and resulting savings this means to the customer in his electric bill) by the manufacturer's selling agents. Indirectly, important conservation of our energy resources occurs. However, this latter aspect may be transparent to the usual consumer and, as a result of not being directly meaningful, generally ignored when the user is contemplating the purchase of a new energy consuming product.

Electrical loss and the resulting ENERGY LOSS in the ordinary kind of electric motor mostly takes the form of eddy-current loss in the stator core material, and "copper" or winding-resistance loss. So-called "advances" in insulating materials and magnetic (field) core materials have further aggravated these losses in that, while improved efficiency might be obtainable under FULL-load operating conditions, the percentage of losses tend to soar as the load coupled to the motor is lessened. Reality suggests that most of these kinds of "advances" are aimed at making a "cheaper" motor, and not necessarily a motor having better overall electrical performance in the sense of being able to reduce unnecessary energy consumption. One can quickly realize that the design choice of operating a stator core near saturation, as is allowed in modern motor design, leads to considerable eddy current loss and that this loss remains substantial even when the motor is unloaded. Running a motor's winding very hot, because the plastic insulation used in the motor's construction is more tolerant than ever before, also leads to increased winding resistance and naturally to greater electrical losses. Another consideration is that of (reactive) power-factor decreases brought forth under partial (or no-load) conditions, which causes high apparent current flow through the windings and therefore, even under reduced load, the copper losses remain high. Yet a further consideration of such high magnetic-field operation of a common electric motor is that of the production of relatively high noise levels (e.g., "hum", "buzz", and the like) which are at best annoying. Such noise is related to the same factors which bring about eddy-current losses: noisy operation is in part the result of magnetostriction in the field core material.

A common induction motor, which might be typified by the General Electric type 5KH22EJ0367 that is nameplate rated for ⅓ horsepower, draws about 5 amperes from the 115 volt a.c. line when fully loaded and operating around 3,450 R.P.M. with about 70-80% power factor or better. Even under NO-load, the same motor continues to draw about 3.8 amperes, although the motor current phase very considerably lags the voltage phase and the power factor has slipped to about 0.2-0.3 (i.e., 20-30 percent). It is under this latter NO-load condition (or under a state of partially reduced load) where considerable real electric power is wasted because the actual efficiency of the motor is measurably very poor. To a large extent, this low operating efficiency is caused by the aforementioned eddy-current and copper losses. I have found that taking this same type of motor and, through the expedient of merely reducing the applied line voltage to about 85 volts or so, I can reduce the NO-load current draw to only be about 1.1 amperes. Meanwhile, the operating power factor also increases (because the motor "appears" to be working harder in proportion to the available applied a.c. power). What I have accomplished through this reduction of applied voltage is to bring about a reduction of the magnetic field strength in the stator which results in greatly lowered eddy-current loss, together with reducing the apparent current flow through the field winding which, of course, means a lot less copper loss.

I realize that the singular act of merely reducing the motor's available operating voltage is inappropriate because, while the motor may run satisfactorily with NO-load, it will stall and overheat when the load increases. It also may not start, particularly when operating under load. Therefore it is known to be necessary to alter the magnetic field which is induced by the RUN winding to match the motor's instant loading.

Frank Nola of N.A.S.A., in his U.S. Pat. Nos. 4,052,648 and 4,266,177, describes a controller which varies the power applied to the main stator (running) winding of an induction motor and as such he attempts to reduce magnetic field strength and winding current when the motor is less than fully loaded. Unfortunately, Frank Nola's approach serves to phase-control the power applied to the whole stator (run) winding and as such tends to introduce severe harmonic distortion into the a.c. current waveform which results in parasitic losses which can outweigh any gains which might otherwise be obtained in the motor's net operating efficiency. In effect, Nola introduces loss producing effects which outweigh any gains he might otherwise obtain in the more efficient operation of a common appliance-grade induction motor. Such shortcoming of the Nola device occurs because power flow is drawn only over a portion of each a.c. power half-cycle, after the phase-delayed thyristor is fired. The result is that a.c. power draw causes large changes in the instantaneous a.c. current flow present in the a.c. power cycle after thyristor conduction occurs relative with the negligible level immediately prior to thyristor conduction. The a.c. power cycle distortion introduced by these large and sudden changes in load current draw also tend to become more exaggerated through reactive a.c. line impedances which (albeit mostly resistive) can be quite substantial. The surges caused by phase-delayed power control of such large amounts of current will also cause flicker in any ordinary lights hooked to the same circuits, as is commonplace in domestic wiring practice. As a result of these kinds of parasitic losses and other side effects, phased-delayed firing of a thyristor as the control for total current flow to a motor's run windings is less than satisfactory in most induction motor applications, and as such does not find much commercial useage.

What I have now discovered as a novel and viable alternative to controlling the full power applied to the motor's windings is to instead provide the motor with some plurality of functionally paralleled sets of run windings. For example, two run winding sets may be used, and each set may have somewhat different winding construction (viz, number of turns and wire guage). The result is a main run winding and a supplementary run winding. The main run winding is suitable sized such that, when fully coupled with the a.c. line power, it may provide enough magnetic field strength in the stator to operate the motor under the condition of: a) intermediate loading: b) least expected load: or c) perhaps under a state of no load. The supplementary run winding is then sized to induce sufficient additional magnetic field, when coupled fully with the a.c. line, so that the induced additional field strength may be added to the magnetic field produced by the main run winding, with the combined field having sufficient total strength to operate the motor under full load.

This brings about two modes of operation for the motor: full load capability, and reduced load capability. Under the full load arrangement, the motor will exhibit operating conditions which are equivalent to those of any other ordinary electric motor having but one heavy run winding. Under the reduced or no load condition (when only the main run winding is excited), the motor will continue to operate with a relatively high power factor, good electrical efficiency, and with negligible temperature rise. I find that the novel control of the amount of a.c. power coupled with the supplementary run winding alone may now be accomplished using phase-controlled thyristor power control to adjust the instant stator field strength to the motor's load requirements.

The result is improved overall motor operating efficiency and better energy utilization. Unlike Nola and other prior teachings, the full connection of the main run winding with the a.c. power line under all load conditions serves to snub-out most of the a.c. power harmonic distortion losses because the main run winding draws operating current (under relatively high power factor) over the full a.c. power cycle, whereas the supplementary winding draws only a smallish portion of the a.c. power over each remaining a.c. power half-cycle subsequent to thyristor turn-on. The net result is continued high efficiency for a motor utilizing my invention under varying load conditions.

In most major appliances such as typified by a washing machine, the load demand on the motor changes during different portions of the machine's operating cycle. For example, during wash-agitation the power demand is quite different from that needed during the period when the water in the tub is being pumped out. In the common kind of washing machine, such operating cycle portions are controlled by a programmer such as an electromechanical timer switch or, more modernly, by a microprocessor or other electronic control device. In a similar way, the several portions of the usual operating cycle for dishwashers, clothe dryers and other appliances can vary over a relatively wide range. A Delco (General Motors Corp.) type C-1660 motor, rated for ⅓ horsepower at 1,725 R.P.M. is known to draw about 6.9 amperes under full load, and such a motor has been widely used in Kenmore (Sears and Roebuck Co.) automatic washing machines. Assuming an 80% power factor (under full load) and a true horsepower equalling about 746 watts, such a motor runs about 39% efficient:

$$((746W/3)/((115V \times 6.9A) \times 0.8PF)) \times 100 = 39.173\%$$

As the load is reduced however, apparent motor current remains high: dropping off to about 4.9 amperes under no-load, albeit the power factor is down to about 20–30%. Thus even under such an unloaded condition, the motor still burns about 113 to 170 watts:

$$(115V \times 4.9A) \times 0.25PF = 140.875W$$

and additionally, the high apparent current flow (4.9 amperes) continues to cause current-flow losses in the motor winding resistance and in the interconnecting wiring (house wiring, etc.) supplying power to the motor.

I have now found that these earlier kinds of appliance designs can be made considerably more efficient through the expedient of using my novel multi-winding motor and variously modulating the instantaneous amount of electric power fed to the supplementary run winding to best match each of the several portions of each operating cycle while the main run winding is fed full a.c. line power. I have also found that the programmer can be used to fractionally predetermine the amount of a.c. power fed to the supplementary run winding during each machine cycle portion through the expedient of varying the gate turn-on phase delay for a thyristor which serves to feed a.c. power to the supplementary run winding.

In particular, I have found that through the use of two (or more) run windings, with each RUN winding differently proportioned, and with each run winding fed power through a separately controlled (timer cam-actuated) switch contact set, a switchable range of motor excitation levels may be obtained. The novelty I introduce through this operational approach lends itself to use with time-proven electromechanical timer programmers wherein each portion of the appliance's usual operating cycle actuates different switch contact sets to obtain different interaction between the run windings that results in best power utilization for each program cycle step. When my invention is utilized in this manner, no electronic devices such as thyristors and the like are used. Therefore the reliability of the overall appliance product is unchanged, if not made better due to less heat buildup.

In refrigeration systems, and more particularly in air-conditioning systems, the a.c. power needed to operate the compressor may be expected to vary in accord with cooling demand operating conditions or outside ambient temperature influences. It is through the sensing of these operating conditions or influences and their utilization to control the delay for the firing of a control thyristor used to feed a.c. power to a supplementary run winding that considerable savings in electric power can be realized. Like the aforementioned appliance, a central programmer or control circuit may be utilized to produce signals that can vary the time-delay for thyristor turn-on to obtain such supplementary run winding excitation power modulation. The result is a very considerable savings of electrical energy.

I also know that the development of the modern electric motor, as it has evolved over the years, has resulted in considerable investment by manufacturers in equipment for the efficient manufacture of these motors. Furthermore, the user of these motors (particularly the appliance product manufacturer) have developed a level of confidence in the reliability of certain motor design configurations. It is therefore fundamental that you realize that my invention is capable of being incorporated into these earlier motor design embodiments with a minimum of modification with the result that historical reliability and time proven performance is not compromised. Furthermore, manufacturing cost is not affected to any significant extent, because the only change in motor structure is merely that of adding a few more turns of smaller guage wire: the end result is that about the same amount of "copper" winding material is used.

In-so-far as is known to me, no prior induction motor apparatus has brought together the use of a plurality of run windings where one main winding is ordinarily fully excited from the a.c. line over the full power cycle, while the other supplementary winding is switched ON and OFF, or modulated to bring about the most effectual level of motor field excitation necessary to obtain sufficient motor power to meet the instant motor load demand. More particularly, no prior art is known to me in which much of the motor's operating power is drawn over the full a.c. power cycle by the main RUN winding, whilst additional power is drawn over a portion of the cycle by the supplementary run winding with the result that the power drawn over the full cycle by the main run winding serves to be of sufficient magnitude to swamp out and thus minimize waveform distortions and other undesirable influences on operating efficiency which might otherwise be introduced by the phase controlled firing of a thyristor to variously excite the supplementary run winding.

Knowing the advantage of controlling the a.c. power fed to the supplementary run winding under different load conditions, it now follows that in many applications the load requirements may be expected to conform to predictable patterns and therefore the programmer intrinsic with the machine's control apparatus may best constitute a predetermined source of signals suitable for variously modulating the a.c. power fed to the supplementary run winding. The actual amount of a.c. power fed to the supplementary run winding during any given portion of the machine's operating cycle may of course be efficiently controlled by a phase controlled thyristor switch having several different predeterminable values of phase-delayed turn-on period characteristics.

Additionally, I have anticipated that two or more supplementary run windings may be provided, wherein each one is controlled separately to afford several differing levels of field excitation. With two supplementary windings, the following four levels of field excitation can be obtained merely by switching the different windings full-on or full-off.

| Motor Power Operating Mode | MAIN RUN Winding | SUPPLEMENTARY RUN WINDING | |
|---|---|---|---|
| | | No. 1 | No. 2 |
| FULL Power | FULL ON | FULL ON | FULL ON |
| PARTIAL Power A | FULL ON | FULL ON | FULL OFF |
| PARTIAL Power B | FULL ON | FULL OFF | FULL ON |
| LOW Power | FULL ON | FULL OFF | FULL OFF |

Since operation in this manner may be obtained from purely electromechanical cam-driven timer switches or the like, typified by that of the Part No. 367929 cam operated programmer made by Controls Company of America, my invention's implementation becomes not only uncostly to implement but also unchanges the time-proven reliability of an appliance product which commonly uses such kinds of electromechanical timers. Such "full-on" and "full off" operation of the supplementary run windings (i.e., with power flow over the full a.c. power cycle) by mechanical switch contacts also clearly precludes any detrimental loss effects which might occur from thyristor control of the power levels. Furthermore, it is anticipated that the main winding may be turned off and operation obtained from the excitation provided by the supplementary run winding(s) alone.

SUMMARY

Operation of partially loaded a.c. induction motors can lead to considerable energy waste. A modern electric motor design is best suited to drive its full intended load: anything less means considerable lost power and inefficiency.

My invention now comes forth to teach a novel form of induction motor apparatus having two or more parallel run winding sets, each producing their own level of magnetic field which is combined to provide the necessary operating field for the motor's proper operation. My invention also tells how to operate this plurality of run windings in a most energy efficient method.

I show how to save a lot of electric energy through the reduced excitation of any supplementary run winding set, while the main run winding set is normally fed a full portion of a.c. power over the full a.c. power cycle. In other words, the main run winding set draws a.c. power over a fully 360 electrical degrees during each a.c. cycle, while the supplementary run winding may be controlled to draw a.c. power over less than 360 electrical degrees. With the main run winding sized so as to produce sufficient magnetic field to operate the motor under minimum load, no a.c. power need be fed to the supplementary run winding when the motor is unloaded (e.g., operating under minimum load). As the mechanical load which is driven by the motor increases, the a.c. power fed to the supplementary winding is increased: usually through phase-angle controlled firing of a thyristor which feeds a.c. power to the supplementary run winding. Thus, the supplementary run winding is modulated with a.c. power which flows for a portion of each a.c. power cycle, and the duration of each power cycle portion may be predetermined to match the instant mechanical load demand which may be placed upon the motor.

Due to the main run winding drawing nearly a full quota of a.c. power over the full a.c. power cycle irrespective of what portion of the a.c. power cycle is coupled with the supplementary run winding, considerable improvement in operating efficiency is obtained. Such improvement occurs mainly because the substantial amount of full-cycle power flow into the main run winding serves to swamp (e.g., reduce the detrimental effect of) partial power cycle current flow which may be drawn by the supplementary run windings, when its power level is phase-angle controlled by a thyristor switch. In effect, my improvement brings about a novel "smoothing" of the usual harmonic (waveform) distortion which occurs if the full motor current demand is thyristor controlled over merely a part of each a.c. power cycle, such as done in prior art such as taught by Frank Nola in his U.S. Pat. No. 4,266,177, and by Ten-Ho Chang et al in their U.S. Pat. No. 4,533,857.

It is thus the fundamental essence of my invention to obtain better power line utilization through not only the reduction of a motor's electrical power demand through effectively increasing the apparent a.c. impedance of the run winding when the motor is lightly loaded, but also to considerably improve the waveform of such a.c. power draw which is taken from the a.c. power source when the motor is lightly or intermediately loaded and actual electrical power demand is proportionately reduced. I obviously obtain the desired increase in apparent run winding impedance by having two (or more) run windings, one of which is fully excited by the a.c. power source while the other is (others are) fed portions of a.c. power which relate to motor loading either as measurably determined or as predictably predetermined. Waveform improvement is obtained because most of the a.c. electric power draw needed for lightly loaded motor operation is drawn over the full a.c. power cycle by the main run winding, while the supplementary run winding draws (windings draw) power only as necessary over some part of each a.c. power cycle. The result is that the main run winding power draw tends to swamp any deleterious effects which may be introduced into the a.c. power line (due to line impedance effects and the like) by delayed turn-on of power to the supplementary RUN winding(s) during any given a.c. power cycle (or half-cycle).

I obtain such better motor operation through merely including a plurality of properly proportioned run winding sets. Usually two winding sets are used: a main run winding set and a supplementary run winding set.

Each winding set produces an attendant magnetic field which is additively combined to produce a total magnetic field of sufficient strength for the motor to drive any load within its rating. Reducing the excitation to the supplementary run winding has the effect of reducing the magnetic field strength with the further result that the motor's rotor slip will increase and the electrical effect reflected into the main run winding will serve to increase power draw by the main run winding. In other words, any increase in the supplementary run winding excitation tends to reduce the power draw by the main run winding and vice versa (with a steady value of driven mechanical load). You will quickly realize that, through proper sizing of the main run winding, enough power draw will occur in the main run winding alone to operate the motor under its (predetermined value of) minimum load and most importantly that the a.c. power factor reflected into the a.c. power line will be relatively high because the overall effect is like that of driving the minimum load with a smaller motor which is working harder.

Best control action for steering a.c. power to the supplementary RUN winding is had when the main RUN winding is kept operating under full apparent load: that is, the full-cycle a.c. power flow to the main RUN winding is maintained near its maximum level. Additional current flow introduced into the supplementary RUN winding is then proportioned to merely supplement the main RUN winding when the main RUN winding current flow tends to increase beyond its maximum design value. Thus, the best full cycle current flow from the a.c. power source is maintained, with the least introduction of harmonic losses, etc. by the partial-cycle phase-delayed power flow into the supplementary RUN winding.

Additionally I propose to produce operation of my novel motor having several RUN windings through the selective switching of different combinations of the available RUN windings by an electromechanical timer device. When operated in this manner, my invention obtains best performance when the two (or more) RUN windings are each sized differently and the mere switching of each RUN winding is provided by separate switch contact sets on the timer. Under such an operating arrangement, any of several levels of motor field excitation may be obtained and yet full cycle power flow occurs, eliminating any concern for losses due to harmonic distortion, and making concerns of reliability depreciation due to the inclusion of electronic circuitry for the motor's operation a moot point.

The fundamental purpose for my invention is to teach a more energy efficient electric induction motor in which the magnetic field strength is adjusted in approximate proportion to motor loading.

A further purpose for my invention is to show the use of a plurality of RUN winding sets, each inducing magnetic fields which additively combine to produce the operating field strength for the motor under any particular set of operating conditions.

Yet another purpose for my invention is to provide a main RUN winding set which is mostly coupled with a power source, and a supplementary RUN winding set which is variably coupled with the power source.

Still another purpose is to show how predetermined values of a.c. power may be fed to the supplementary RUN winding set to obtain just enough motor excitation to operate the motor under different values of mechanical load demand.

A further purpose is to instruct how my invention's advantage of reduced ENERGY WASTE may be accomplished with motors of rather ordinary manufacture and operated by electromechanical programmers of conventional design.

Importantly my invention now shows how an induction motor having commonplace structure may be improved upon so as to obtain considerably better operating energy utilization under a variety of driven load levels, and how such improvement may be obtained without suffering any reliability of the product.

My invention intends to show how eddy-current losses and winding ('copper') losses may be substantially reduced in an unloaded or partially loaded induction motor.

I show how better a.c. power factor may be obtained from a lightly loaded induction motor.

Given also is a teaching of how a main RUN winding which acts to draw nearly full a.c. power over the full a.c. power cycle acts to swamp-out, and thus minimize the deleterious effects introduced by phase-delay controlled partial power flow into the supplementary RUN winding.

Mainly my invention provides an energy saving improvement applicable to a.c. induction motors of conventional design and ordinary manufacture without causing any significant change in assembly procedure or increase in production cost of the motor.

My invention is also believed to have obvious applicability to induction motors of all kinds irrespective of their power level and, when included in the design of a motor, very meaningful energy savings may be obtained.

Given also is benefit for hermetically sealed refrigeration equipment and the like in that a considerable reduction in waste heat is wrought by the bettered efficiency of a motor operating under my invention's teaching, with the result that not only is reliability improved due to less apparatus heating and lubrication breakdown, but the refrigeration system may have to work less hard to get rid of the usual waste heat which is otherwise transferred into the refrigerant agent.

These and other objects of my invention's method and described embodiment will now become apparent to a skilled artisan upon viewing my drawings and studious reading my invention's description.

DESCRIPTION OF MY INVENTION

Figure 1:
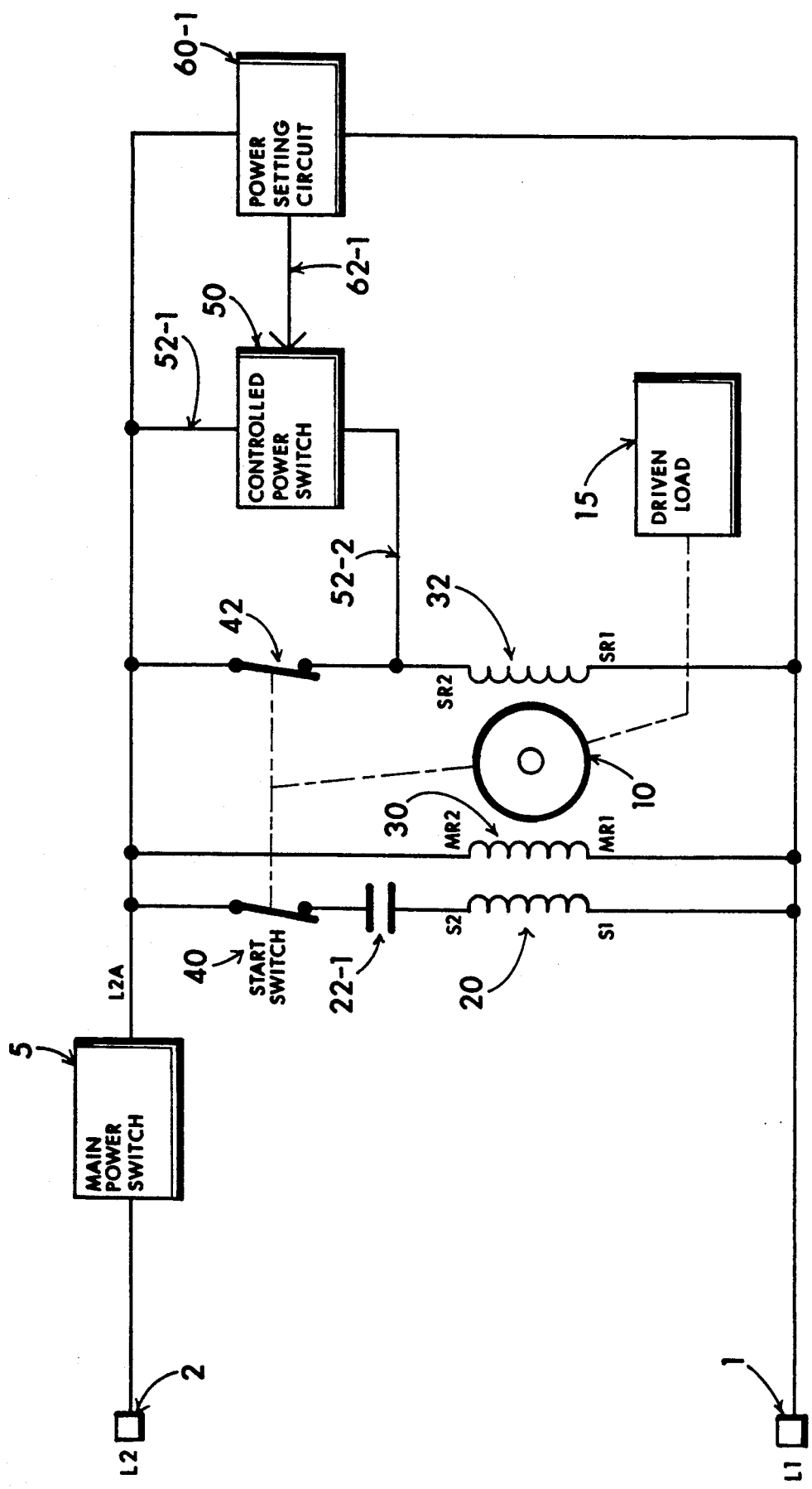
FIG. 1—Motor having two RUN windings operated by a power setting circuit to obtain power match with a driven load.

A.c. power couples into lines 1, 2 of FIG. 1. Power flow is obtained through a main power switch 5 coupled to the input line L2, a start switch 40 coupled to line L2A, a starting capacitor 22-1 and terminal S2 of a start winding 20, while terminal S1 couples with the other input line L1. The result is that the a.c. voltage impressed across the inputs L1, L2 appears across the start winding 20 (when the switches are closed). A main run winding 30 having terminals MR1 and MR2 also couples with the a.c. power appearing between lines L1 and L2A. Another switch contact set 42 (that is normally closed when the motor is at rest) serves to couple the a.c. power on line L2A directly into the SR2 terminal of the supplementary run winding 32. The combination of power applied to the start and two run windings is sufficient to establish a magnetic field in the motor structure that will cause the rotor 10 to spin, thus driving the driven load 15.

The main run winding 30 is predetermined by design to have sufficient ampere-turns to produce the flux necessary to operate the motor under a condition of minimum driven load level. As the driven load increases, the rotor 10 tends to slip more and the result is that the current drawn by the main run winding increases. Left alone, the motor would "overload" and most likely the main run winding 30 would burn-out. However the very essence of my invention is to add more magnetic flux to the motor field, through the use of the supplementary run winding 32 to obtain efficient motor operation up to its maximum load capability. This increase-on-load-demand operation is obtained by controlling the amount of power fed into the supplementary run winding 32 after the motor has gained operating speed and the start switch contacts 40 and 42 have opened. A controlled power switch 50 (which might be a thyristor) serves to couple the a.c. power on line 52-1 (as obtained from line L2A) through to line 52-2 that couples with terminal SR2 of the winding 32. It is anticipated that the power switch 50 may provide partial power flow, no power flow, or full power flow depending upon the driven load 15 demand placed on the motor. The exact level of supplementary run winding excitation may be predetermined by a power setting circuit 60-1, that produces a power-level signal on line 62-1 which controls the instant operation of the power switch 50.

Figure 2:
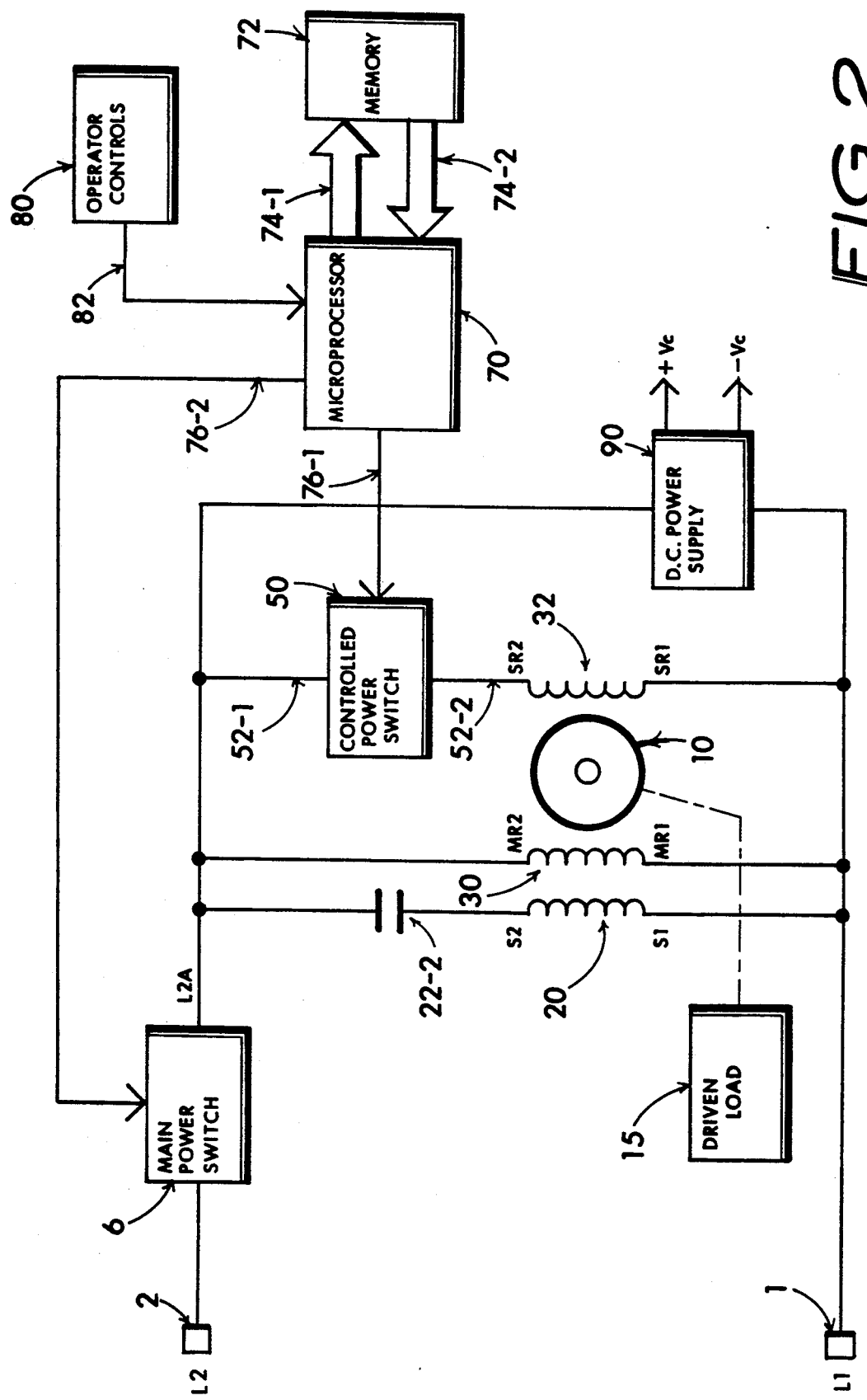
FIG. 2—Motor having two RUN windings in which one winding is power controlled by a microprocessor to match the motor power to a driven load and including operator control adjustment.

In FIG. 2 I show the operation of a permanent split capacitor (PSC) motor including START winding 20, and two RUN windings 30, 32 that drive the rotor 10 which couples with the load 15. The start winding is provided with a.c. power from line L2A that couples with line L2 through the main power switch 6. The a.c. power fed to terminal S2 of the start winding is shifted in phase by a capacitor 22-2 which operates to alter the phase relationship of winding 20 with that of windings 30 and 32, thus providing a "rotating" field necessary to at least start the rotor 10 into rotational operation. A microprocessor 70 is used to combine the contents of a memory 72 which is addressed by lines 74-1 and read by lines 74-2, and the operator control 80 settings provided as signals on line 82 to produce a power control signal on line 76-1 that is determined by the instant value of the different combined signal levels. As such, the power fed to the supplementary run winding 32 is modulated in accord with at least a predetermined (e.g., expected) level of driven load demand.

Figure 3:
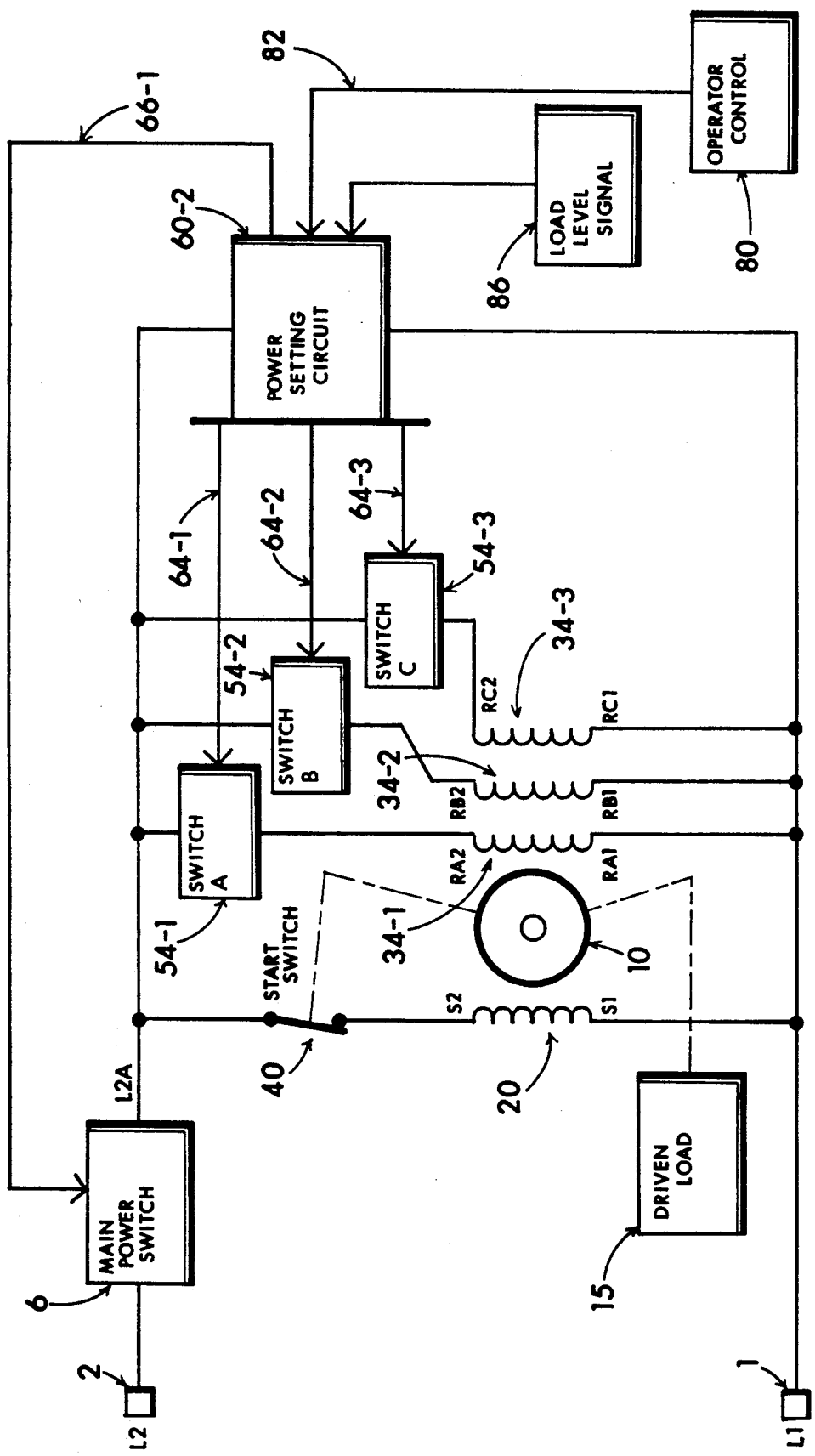
FIG. 3—Motor having several RUN windings operated by a power setting circuit in several combinations of power flow in order to obtain best match between motor power and driven load demand as may be determined by a load level sensor in response to operator control.

The motor may be provided with more than two run windings; for example in FIG. 3 I teach a motor having three run windings 34-1, 34-2, and 34-3 each of which produce magnetic fields having finite strength. The combination of all three of the run windings serve to produce enough field strength to operate the motor under full load, when they are fully powered from the a.c. power that may appear between terminals L1, L2. Each run winding is separately controlled by a switch 54-1, 54-2, 54-3 respectively. A power setting circuit 60-2 adapts the signals on line 82 produced by the operator control 80 together with the load level signal provided by a source 86 to provide power level signals that couple from the power setting circuit 60-2 on the output lines 64-1, 64-2, 64-3 with Switch A, B, and C. The operation of the power setting circuit is such that any combination of the three run windings may be excited and furthermore any one or all of the run windings may be partially excited to some extent (as by phase-control using a thyristor). Thus, numerous power levels may be obtained:

| SWITCH A STATE | SWITCH B STATE | SWITCH C STATE | RELATIVE MOTOR FIELD STRENGTH & OUTPUT POWER |
|---|---|---|---|
| CLOSED | CLOSED | CLOSED | MAXIMUM |
| CLOSED | CLOSED | OPEN | INTERMEDIATE A |
| CLOSED | OPEN | CLOSED | INTERMEDIATE B |
| OPEN | CLOSED | CLOSED | INTERMEDIATE C |
| OPEN | OPEN | CLOSED | INTERMEDIATE D |
| OPEN | CLOSED | OPEN | INTERMEDIATE E |
| CLOSED | OPEN | OPEN | INTERMEDIATE F |

Figure 4:
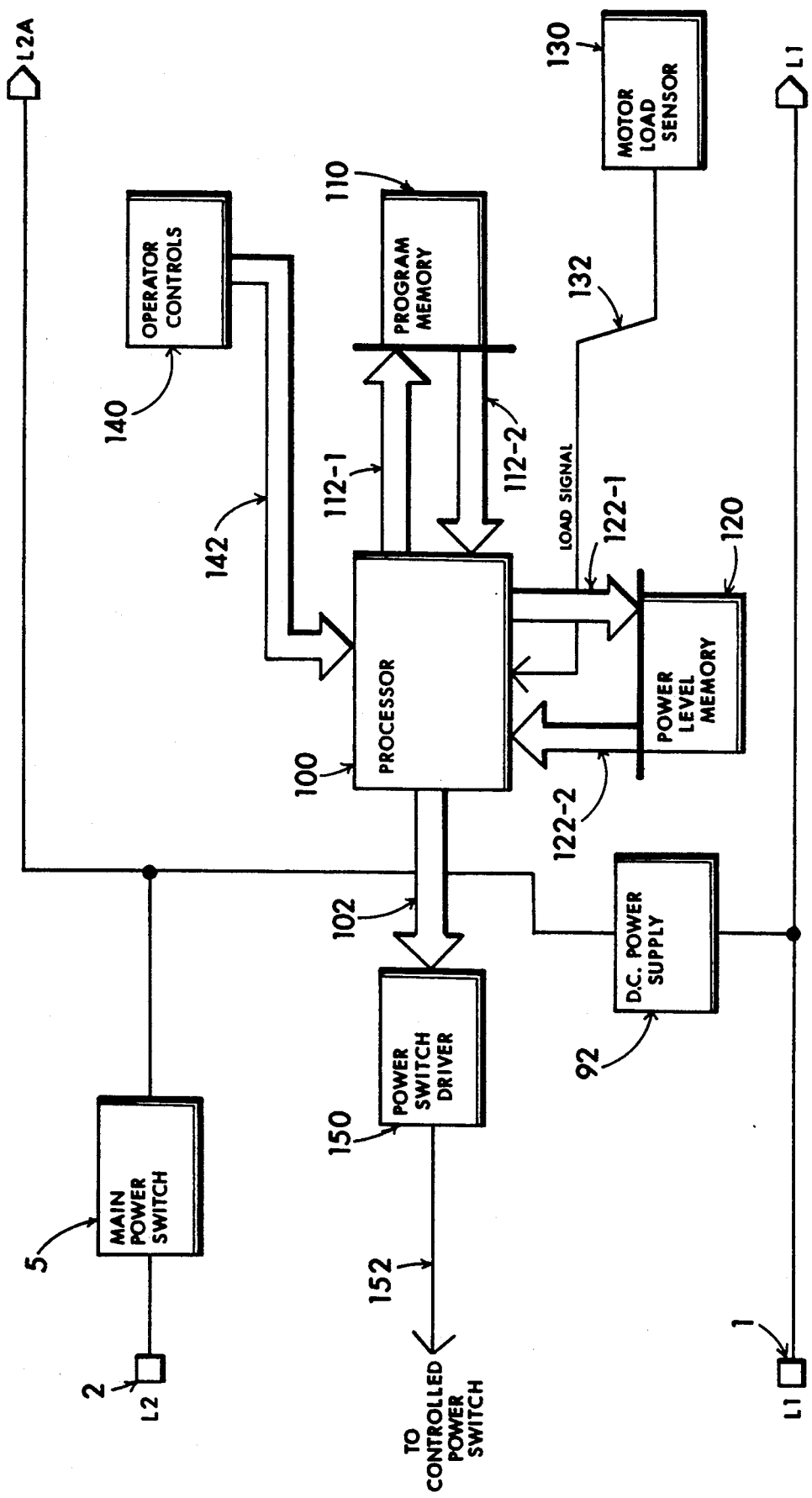
FIG. 4—Detail hookup of a suitable arrangement for power setting circuit using a processor, memories, a load sensor, and operator controls which combine to produce a drive signal for a controlled power switch, such as a thyristor.

FIG. 4 shows a processor 100 comprising combinatorial logic circuitry, and which may conveniently be a microprocessor integrated circuit or the like. A program memory 110 which is addressed by lines 112-1 and provides data on lines 112-2 serves to provide the data to establish the sequential train of events, or operating steps, which the processor 100 may follow. Additionally, a power level memory 120 is addressed 122-1 and provides data on bus 122-2 that serves to determine the power level which the induction motor needs to develop in order to drive the load. Also, a motor load sensor 130 may produce a signal on line 132 that is representative of some quantity indicative of motor load: for example, motor current, a.c. phase lag, or speed change (e.g., subsynchronous speed slip variation). Also the operator may set overall operating parameters via the operator controls 140 that provide a signal on line 142 that couples with the processor 100. In a washing machine kind of appliance, such operator control interface is providable by the usual "knob" or "push-button" selectors commonly used to pre-set cycle-stage performance such as "rinse", "spin-dry", "wash", etc. The processor determines the value of a power control signal which is provided on line 102 and then couples with the power switch driver 150 that in turn produces a suitable drive signal on line 152 to operate the controlled power switch 50 which was depicted in FIGS. 1 and 2. Obviously the controlled switch may be a thyristor (i.e., triac or silicon controlled rectifier) and the driver 150 is therefore a device such as a unijunction transistor, diac, or bilateral diode suited for delivering a train of pulses of sufficient current amplitude to drive the thyristor gate and thus trigger the thyristor into its "on" or conductive state. A shown d.c. power supply 92 also serves to power the various circuit elements, providing 5 to 10 volts d.c. as needed.

Figure 5:
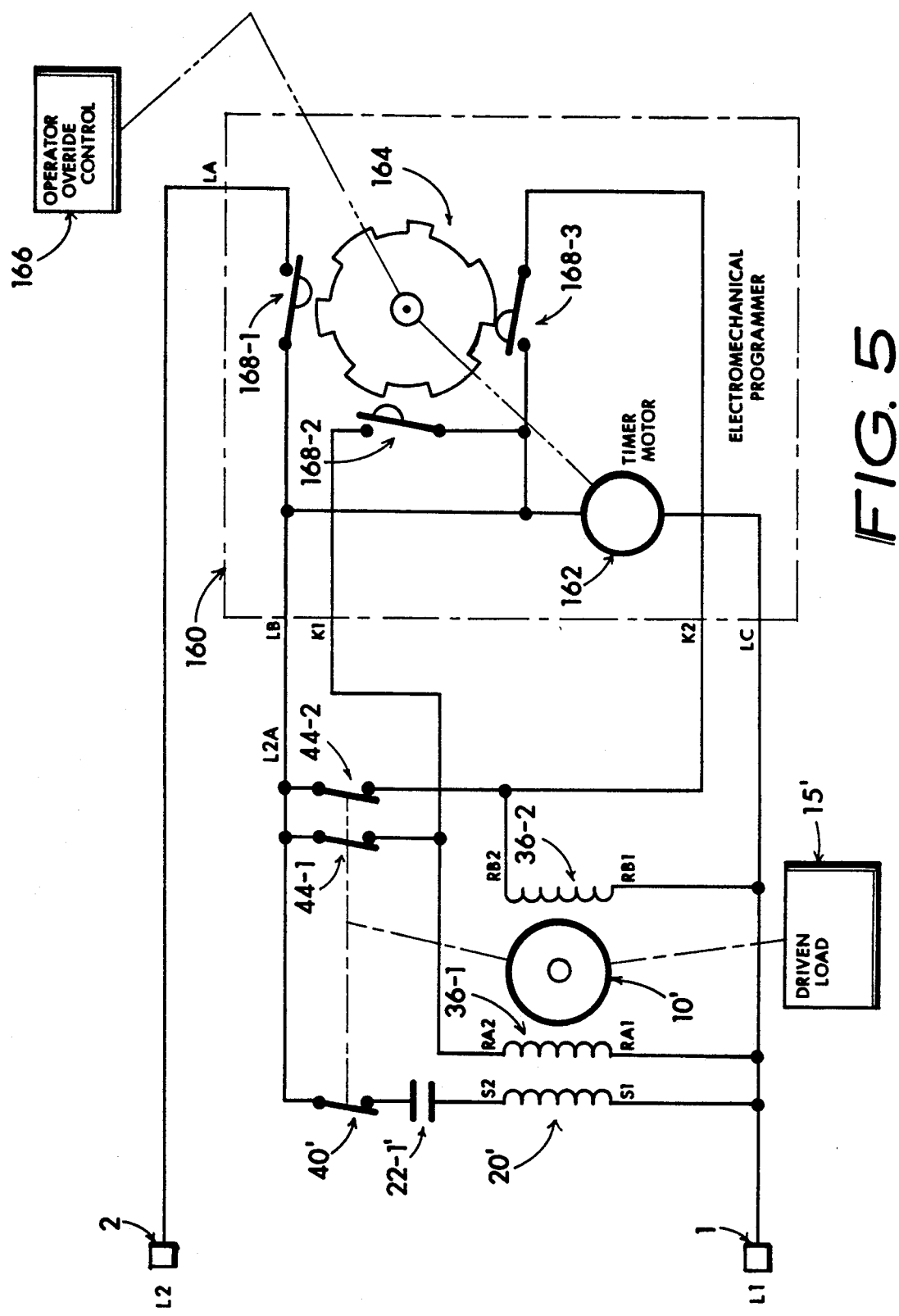
FIG. 5—Motor having two RUN windings in which power of motor is settably changed by an electromechanical programmer to obtain match between motor and load during different portions of a machine's operating cycle.

Electromechanical programmers (timers) have long been used for the control of common household and commercial appliances of all kinds. Such a programmer 160 is depicted in FIG. 5 and includes a small synchronous timer motor 162. A Controls Corporation of America part no. 367629 controller is representative of the style of programmer of which I speak. The slow 2-RPM speed of the motor is further geared down to rotate a set of cams (illustratively shown here as a representative cam 164) having predetermined teeth or camlobes which operate the several switch contact sets 168-1, 168-2, 168-3 in a sequential pattern. Also the cams may be set to some advanced portion of the operating cycle sequence through the use of the operator overide control 166. A.c. power on line 2 (input L2) couples through the contact set 168-1 and provides power on line L2A as provided from terminal LB of the programmer. Thus, a.c. power is impressed onto the induction motor START winding 20', as obtained through the closed START switch 40' and starting capacitor 22-1' (which may assume a value of 150-200 microfarads for the usual kind of fractional horsepower motor found on appliances). The a.c. power present on line L2A is also fed to the two run windings 36-1, 36-2 through centrifugal-device operated switches 44-1, 44-2 (whereby the switches are closed as long as the motor is at rest or running below a predetermined minimum running speed, ordinarily obtained during the "start-up" of the motor when the start switch 40' is closed). The result is full starting torque is provided by the motor to overcome any initial resistance of the driven load 15'. Once the motor obtains normal running speed and switches 44-1, 44-2 open further run windings 36-1, 36-2 current flow is obtained through the closure of either switch contacts 168-2 or 168-3 either separately or together. As such, with the windings properly scaled to produce different levels of magnetic field within the motor the motor may be programmed to obtain three different levels of torque performance, aside from OFF.

| RUN WINDING RA 36-1 | RUN WINDING RB 36-2 | MOTOR POWER TORQUE LEVEL |
|---|---|---|
| ON | ON | FULL |
| ON | OFF | PARTIAL #1 |
| OFF | ON | PARTIAL #2 |

You can see that the prudent designer of an appliance may now obtain performance for the induction motor which best matches each portion of the operating cycle as defined by the programmer 160. As a result, unnecessary energy waste may be considerably reduced.

Figure 6:
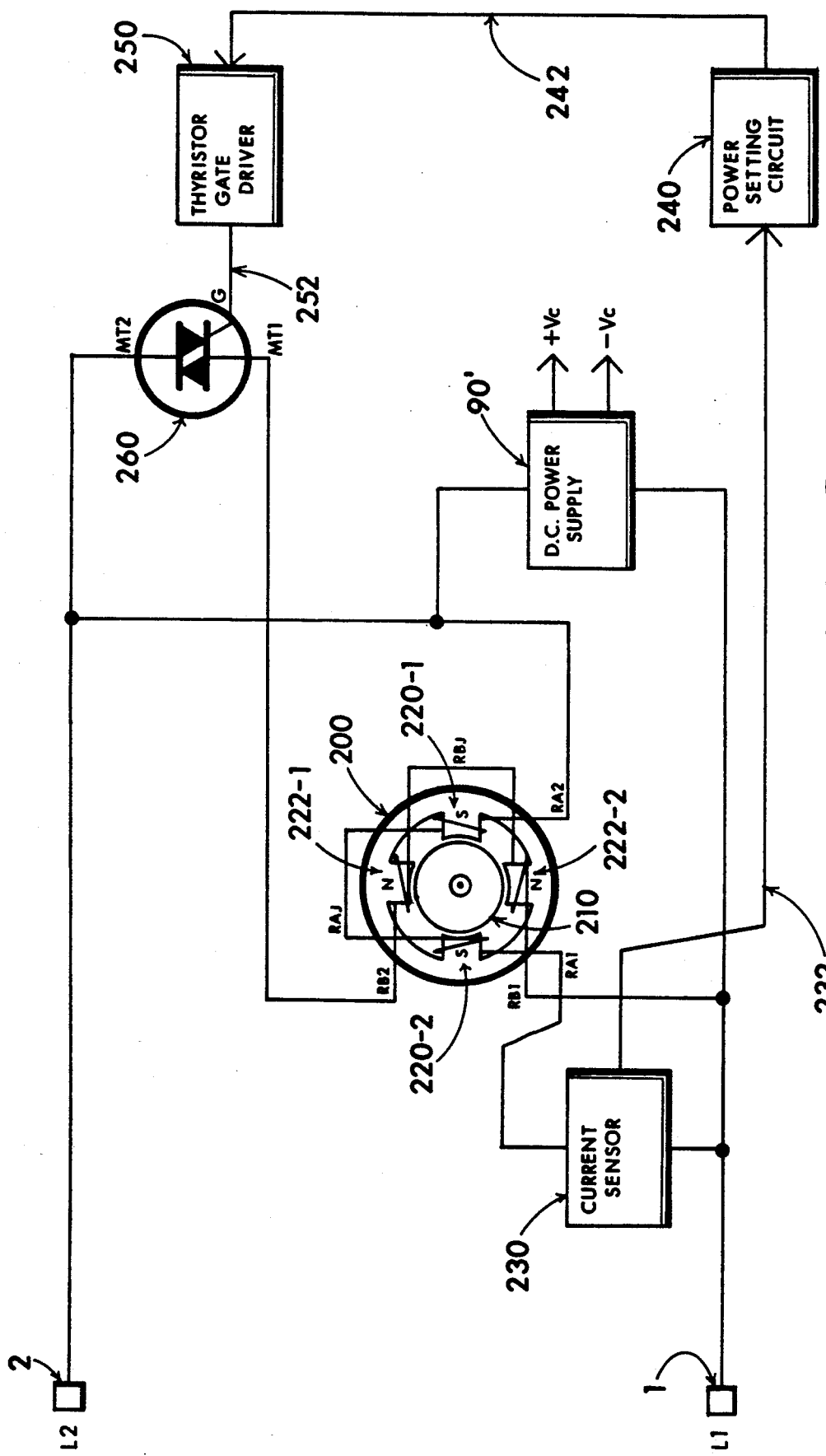
FIG. 6—Illustrative arrangement for hookup of a 4-pole induction motor to practice my invention including a current sensor providing power-demand (or power factor) feedback.

In FIG. 6 I show a common style of 4-pole induction motor 200 having four sets of run windings 220-1, 220-2 and 222-1, 222-2 which provide the magnetic fields necessary to obtain rotation of the rotor 210 that serves to drive the output member. Also intrinsic with the motor (but not shown) is the start winding arrangement, and a centrifugal switch or starting relay. I show this embodiment to enable the artisan to practice the essence of my invention on 115 volts a.c. power using an ordinary commercial induction motor, such as the Westinghouse style 316P293 split-phase ⅓ horsepower, 1725 RPM (e.g., 4-pole) motor which is rated for 230 volt operation. In this motor, the start windings and the run windings are all connected in series. The artisan may however reconnect the start windings in series-parallel to obtain 115 volt performance. Likewise the run windings are connected into two sets of opposed fields such as I depict in FIG. 6. As such the main run winding set comprising the windings 220-1, 220-2 couple with the a.c. line 2, and a.c. line 1 through a current sensor 230. The other pair of RUN windings 222-1, 222-2 couple with the a.c. line L2 through the thyristor (viz, triac) 260 and return to line L1. When the motor is running, and no substantial load is connected to its output member, the winding pair 220-1, 220-2 may alone operate the motor because the relative magnetic field pole phases will be obtained in their proper N-S-N-S relationship (albeit alternating at 60 hertz) as shown. The current sensor 230 may detect an increase in current or a decrease in current phase-lag (brought on by an increase in mechanical loading of the motor's output member) to produce a signal on line 232 that may then enable the power setting circuit 240 to produce a suitable signal on line 242 which serves to enable the thyristor gate driver 250 to produce a pulse of suitable efficacity on line 252 to turn the thyristor 260 ON, and thus increase the power flow to the supplementary run windings 222-1, 222-2.

FIG. 6 is also important in that it illustratively brings forth the slight impact utilization of my invention has on pre-existing motor manufacture. In other words, the electrical design and physical structure of the common kind of induction motor is little changed by adapting my invention. It is therefore clear that considerable energy conserving performance improvement can be obtained with little additional cost and with no sacrifice of time-proven reliability (particularly if the embodiment scheme of FIG. 5 is used).

My invention may be practiced with some variation by a skilled artisan without departing from the central essence of my invention: that being to obtain ENERGY CONSERVATION through the use of a plurality of run winding sets which obtain modulated excitation relative with one-another in order to minimize eddy-current losses wrought by magnetic structure saturation, and copper losses wrought by high apparent current flow (brought on by low power factor operation) found in a lightly loaded ordinary kind of motor. RUN winding excitation is also controlled in proportion either with instant load as sensed and determined through feedback control, or conversely through predetermination by a programmer or memory in which a sequence of motor operations are determined and each portion of the sequence is set to have a different level of run winding excitation which match the amount of motor loading expected as normal during that portion.

It is anticipated that a skilled artisan may make considerable variation in the practice of my invention when it is adapted to motors of different manufacture or structure. Such variation is considered obvious by me in view of the considerable prior art in the area of motor structure manufacture, such as the choice of starting circuits, and the relationship of field windings with stators and rotors. I have expressed an improvement in obtaining excitation of the magnetic structure of an induction motor, wherein considerable (albeit modulated levels of) power flow is obtained from the a.c. power source over the full a.c. power cycle.

What I claim is:

1. Method for reducing electrical energy consupltion by an electric induction motor comprising the steps of:
   providing a source of first alternating current magnetic run field;
   providing a source of second alternating current magnetic run field;
   substantially coupling the first and second magnetic run fields to produce an effective combined magnetic run field;
   producing rotation of an output member by said combined magnetic run field;
   coupling an inconstant load with said output member; and,
   adjusting level of said second magnetic run field and thereby effect change in level of the combined magnetic run field relative with changes which may occur in said inconstant load.

2. Method of claim 1 comprising the further steps of:
   providing the motor with a main run winding to produce the said first magnetic run field;
   providing the motor with a supplementary run winding to produce the second magnetic run field;
   coupling a full portion of electric power to each of the run windings when the motor is about fully loaded; and,
   coupling less than a full portion of electric power to the supplementary run winding when the motor is less than fully loaded.

3. Method of claim 2 comprising the further steps of:
   structuring the main run winding with a choice of ampere/turns and wire guage to effect a sufficient level of first magnetic run field to operate the motor under a predetermined level minimum load;
   structuring the supplementary run winding with a choice of ampere/turns and wire guage to effect a sufficient level of second magnetic run field which may be combined with the first magnetic run field produced by the main run winding to operate the motor under full load; and,
   supplying the supplementary run winding with just sufficient electric power to obtain effective motor operation under any predeterminable condition of motor loading between that of minimum load and that of full load.

4. Method of claim 2 comprising the further step of:
   sensing changes in motor loading;
   feeding more electric power to the supplementary run winding when the motor loading is sensed to have increased; and,
   feeding less electric power to the supplementary run winding when the motor loading is sensed to have decreased.

5. Method of claim 2 comprising the further step of:
   predetermining a cyclic pattern for the inconstant load; and,
   feeding different levels of electric power to the supplementary run winding proportional to predeterminable values of loading which may occur in different portions of the cyclic pattern.

6. Method of claim 2 comprising the further steps of: establishing the inconstant load to have a serial plurality of substantially different load value periods; and,
   concurrently providing the supplementary run winding with different levels of electric power during each load value period to obtain necessary instant levels of load driving power from the motor.

7. Method of claim 2 comprising the further steps of:
   predetermining a nominal value of POWER FACTOR for electric power flow to the main RUN winding for a fully loaded motor;
   measuring instant POWER FACTOR value of the portion of electric power flowing to the main run winding; and,
   reducing electric power flow to the supplementary run winding when said measured power factor is less than said nominal value of power factor.

8. Method of claim 2 comprising the further steps of:
   predetermining a preferred value of current flow phase lag for electric power flow to the main run winding of a fully loaded motor;
   measuring instant phase lag of the current portion of the electric power flowing to the main run winding; and,
   reducing electric power flow to the supplementary run winding when said measured phase lag is less than said preferred phase lag value.

9. Apparatus for reducing induction motor power consumption, comprising:
   source of a.c. electric power;
   induction motor means including:
     means for producing first magnetic run field excitation;
     means for producing second magnetic run field excitation;
     means for combining said first and said second run field excitation;
     means for obtaining rotation of an output member by influences of said combined run field excitation;
   means for coupling the electric power source with said first run field producing means;
   means for coupling the electric power source with said second run field producing means;
   means for coupling an inconstant load with said output member; and,
   means for changing the amount of coupling produced between the electric power source and the second run field producing means relative with changes in the inconstant load.

10. Apparatus of claim 9 further comprising:
    means for providing a predetermined sequence of expected load changes in the inconstant load means; and,
    means for producing a change in the instant amount of electric power coupled between the source and the second run field producing means relative with each portion of the predetermined sequence of load changes.

11. Apparatus of claim 9 further comprising:
    means for measuring current phase lag of electric power coupled between the source and second run field producing means; and,
    means for reducing the instant amount of electric power coupled between the source and the second field producing means relative with any increase in the measured phase lag relative with a predetermined value of full-load phase lag.

12. Apparatus of claim 9 further comprising:
means for producing start field excation;
means for coupling the electric power source with the start field producing means when the output member is rotating at less than a predetermined minimum value of running speed; and,
means for decoupling the electric power source from the start field producing means when the output member is rotating at or in excess of said predetermined minimum value of running speed.

13. Apparatus of claim 9 wherein said means for coupling the electric power source with said second run field producing means comprises:
thyristor means having a first power terminal and a second power terminal coupled between the source and the second RUN field producing means, and a gate means effective for control the instant state of conduction obtainable between the power terminals.

14. Apparatus of claim 13 further comprising:
means substantially coupled in parallel with and shuntable across the power terminals of the thyristor means and comprising a set of electrical contact means which are brought-together and fully conductive when the output member is rotating at less than the predetermined minimum value of running speed; and,
means for opening said contact means when the output member is rotating at or in excess of the minimum value of running speed.

15. Apparatus for reducing induction motor power consumption, comprising:
source of a.c. electric power;
induction motor means including:
plurality of run winding means producing magnetic fields which may be combined to produce a singular set of run fields;
means acted upon by said set of run fields to obtain effective rotation of an output member;
means for producing inconstant loading of said output member;
means for fully exciting at least a first portion of said plural run winding means by coupling with said source of electric power;
means for variably exciting another portion of said plural run winding means by varying the effective coupling obtained with the said source of electric power; and,
means for changing the variable excitation relative with changes which may occur in the output member loading.

16. Apparatus of claim 15 further comprising:
means for measuring electric power flow through the fully excited portion of the plural run winding means; and,
means for controlling the change in the variable excitation to be about proportional to any changes in the measured power flow.

17. Apparatus of claim 15 further comprising:
means for providing a predetermined sequence of expected load changes in the inconstant load means; and,
means for producing a change in the variable excitation of the second portion of the plural run winding means relative with each portion of the predetermined sequence of expected load changes.

18. Apparatus of claim 17 further comprising:
memory means comprising stored information a first portion of which serves to define a value representative of each step of the predetermined sequence and a second portion of which serves to define the value of electric power coupling to be provided between the source means and the second run winding portion during each step of the predetermined sequence;
combinatorial logic means, such as a microprocessor means, coupled with said memory means and effective to produce output signals which relate to the load demand for each step of the predetermined sequence; and,
means for coupling said logic means output signals with said variable excitation producing means to obtain a controlled level which about corresponds with the driven load demand during each step of the predetermined sequence of expected load changes.

19. Apparatus of claim 15 further comprising:
means for producing a start field; and,
means for coupling the start field producing means with the a.c. power source at least when the output member is at rest or running below a minimum running speed.

20. Apparatus of claim 19 further comprising:
means for fully coupling the run winding means with the a.c. power source at least when the output member is at rest or running below a minimum running speed.

* * * * *